Figure 1:
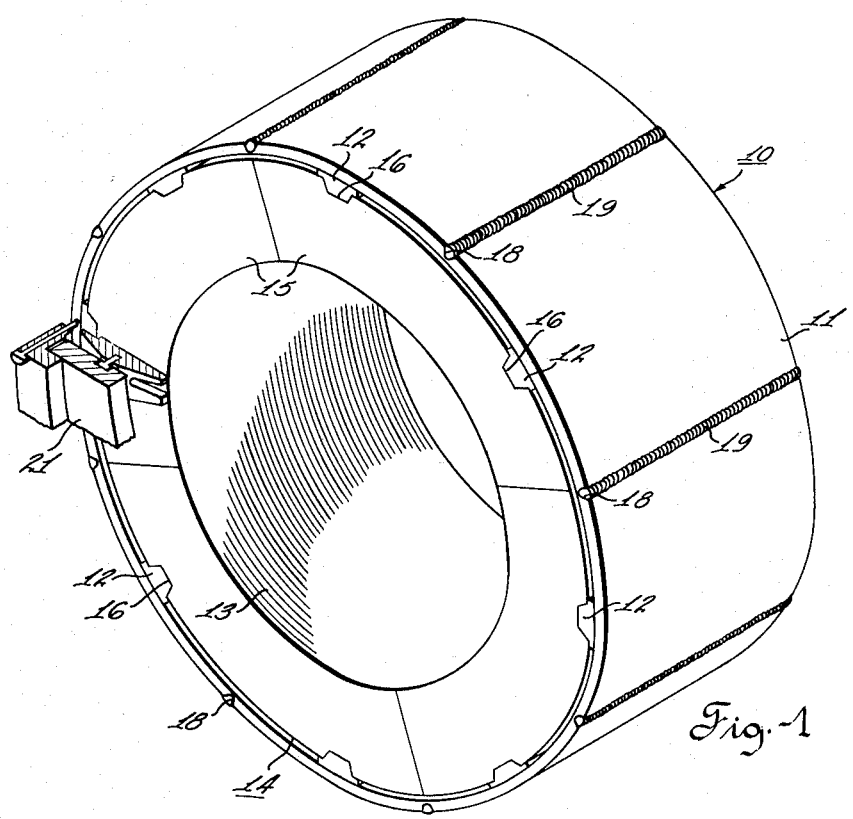

July 12, 1966  E. S. EVANS  3,260,875

DYNAMOELECTRIC MACHINE CORE AND METHOD OF MAKING SAME

Filed Aug. 30, 1963

Inventor
Earl S. Evans
By Robert D. Denson
Attorney

United States Patent Office 3,260,875
Patented July 12, 1966

3,260,875
DYNAMOELECTRIC MACHINE CORE AND
METHOD OF MAKING SAME
Earl S. Evans, Franklin, Wis., assignor to Allis-Chalmers
Manufacturing Company, Milwaukee, Wis.
Filed Aug. 30, 1963, Ser. No. 305,777
3 Claims. (Cl. 310—217)

This invention relates to dynamoelectric machines. More specifically, this invention relates to the clamping of the laminated cores in large generators.

One of the biggest problems with large motors and generators is the loud noise or hum produced during the operation of the machine. Some of this noise is due to excessive movement or vibration of the laminations in the stator core which is caused by loose laminations in the core. Another cause of this noise is the intermittent contact between the laminated core and the structure immediately surrounding the core. This intermittent contact between the core can be reduced or eliminated by eliminating the radial clearance between the core and its surrounding structure.

Many attempts have been made to solve the noise problem by clamping or shimming the laminated core. One well known method is to provide a split casing or shell which surrounds the laminations and then using bolts to draw the halves of the shell together and thereby apply radial pressure on the core. Another way is to heat annular bands and put them around the shell containing the laminated core so that when they cool and contract, they in turn apply a radial clamping force on the laminated core. Both of these methods have been tried and although somewhat effective are cumbersome and expensive.

This invention overcomes the problems mentioned above by providing a unique cylindrical shell surrounding the stacks of laminations which form the core. The core laminations fit into mounting bars attached to the interior of the shell. Grooves are formed in the outer surface of the shell. Then, after the laminations have been assembled within the shell, an axial compressive force is applied to the laminations in any suitable manner. Molten welding material is then put into the grooves of the outer surface of the shells. This welding material fuses with the shell. When the weld metal, the fused metal and adjacent metal of the shell cool from the welding temperature to ambient temperature they cause a contractive force in the entire shell which applies a radially inward force on the stacked laminations.

Therefore, it is the object of the invention to provide a new and improved core for a dynamoelectric machine.

Another object of this invention is to provide a new and improved method of applying a radial compressive force to the laminated core of a dynamoelectric machine.

Another object of this invention is to provide a core for a dynamoelectric machine having a more compact core that produces less noise.

Figure 2:
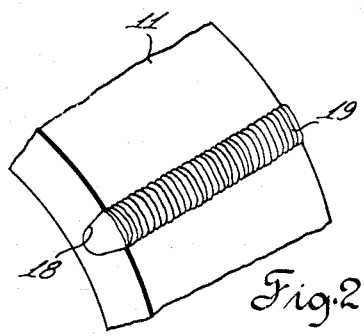

Other objects and advantages of this invention will be apparent from the following description when read in connection with the accompanying drawings in which:

FIG. 1 is an isometric view partially in section of a stator core for a dynamoelectric machine made according to this invention; and FIG. 2 is an enlarged view showing the outer surface of the shell of the core of FIG. 1.

Referring more specifically to the drawings by characters of reference, the invention is illustrated in a stator 10 for a large generator. The stator 10 is made up of a cylindrical shell 11 having a plurality of mounting bars 12 attached to its internal surface. These bars 12 are arcuately spaced around the inner periphery of the shell and extend longitudinally along the shell.

A plurality of laminations 13 are stacked within the shell in the usual manner well known in the art to form the core 14. As illustrated in the drawing, the laminations are made in segments 15 somewhat trapezoidal in shape and having slots 16 in their radially outer edge design to fit over the mounting bars 12 in the assembled position. In smaller machines the laminations may be annular rather than segmental.

Longitudinally extending grooves 18 are formed in the outer surface of the shell 11. Although randomly spaced grooves would be effective in carrying out this invention, the grooves in the illustrated embodiment are substantially parallel to the axis of the core and are located intermediate adjacent mounting bars 12. The grooves are designed to receive molten welding material 19 which causes the outer surface of the shell to shrink and the shell then exerts inward radial pressure on the laminations.

Suitable clamping means such as a finger plate arrangement, a portion of which is shown at 21 in FIG. 1, are provided at the end of the core for providing an axial force on the laminations and to hold them in place within the shell.

In assembly, the mounting bars 12 are attached to the interior surface of the shell 11. This can be done in any manner but as illustrated in the drawing, the bars are welded to the shell. Laminations 13 are then stacked within the shell 11 to form the laminated core 14. In stacking the laminations, the grooves in the outer edge are fitted over the mounting bars on the inner surface of the shell. When a sufficient number of laminations have been stacked within the shell, pressure is applied in an axial direction to compress the laminations together. When the stacked laminations have been compressed sufficiently to form a core of the desired length, the laminations are clamped in place with clamps such as the illustrated member 21. Then the grooves in the outer surface of the shell are filled with a molten weld material. This material causes the outer surface of the shell to contract circumferentially which in turn causes the shell to exert a radially inward force. This force is directed to the laminated core through the mounting bars 12. This radial force together with the axial clamping force provides a stator having good axial and radial compression on the laminated core. In this core, individual lamination vibration and the radial clearance between the laminated core and surrounding structure is substantially eliminated, thus reducing the amount of noise produced by the core during the operation of the dynamoelectric machine.

Although but one embodiment of this invention has been illustrated and described, it will be apparent to those skilled in the art that various modifications and changes can be made therein without departing from the spirit of the invention or the scope of the appended claims.

Having now particularly described and ascertained the nature of my said invention and the manner in which it is to be performed, I declare that what I claim is:

1. A core for a dynamoelectric machine comprising: a cylindrical shell, arcuately spaced mounting bars attached to the interior surface of said shell, iron laminations stacked in said shell to form a core, said laminations having grooves in their radially outer edge engaging said mounting bars, means for compressing said laminations axially of said shell, clamping means for holding said laminations in place, longitudinally extending grooves in the outer surface of said shell and welding material in said grooves to shrink said shell and exert radial pressure on said stacked laminations.

2. A core for a dynamoelectric machine comprising: a cylindrical shell, arcuately spaced dovetail mounting bars attached to the interior surface of said shell, laminations stacked in said shell to form a laminated core, said laminations having grooves in their radially outer edge engaging said dovetail mounting bars, means for compressing said laminations axially of said shell, clamping means for holding said laminations in place, longitudinally extending grooves in the outer surface of said shell intermediate said dovetail mounting bars, and welding material in said grooves to shrink said shell and exert radial pressure on said stacked laminations.

3. The method of assembling a core for a dynamoelectric machine within a cylindrical shell having a plurality of arcuately spaced mounting bars attached to its interior surface comprising the steps of: (1) forming longitudinally extending grooves in the exterior surface of said shell intermediate said bar, (2) stacking a plurality of iron laminations within said shell with the radially outer surface of the laminations engaging said bars, (3) compressing said laminations in a direction parallel to the axis of said shell, (4) clamping said laminations in place, (5) filling said grooves with a molten welding material to cause said shell to contract and thereby apply a radial inward force on said laminated core.

References Cited by the Examiner
UNITED STATES PATENTS

| | | | |
|---|---|---|---|
| 2,112,747 | 3/1938 | Wood | 310—258 |
| 2,790,918 | 4/1957 | Goran | 310—217 |
| 2,876,371 | 3/1959 | Wesolowski | 310—217 |
| 3,092,897 | 6/1963 | Agner | 29—155.5 |
| 3,175,277 | 3/1965 | Brown | 29—155.5 |

MILTON O. HIRSHFIELD, *Primary Examiner.*

ORIS L. RADER, *Examiner.*

J. W. GIBBS, *Assistant Examiner.*